(12) United States Patent
Hsu et al.

(10) Patent No.: US 10,095,038 B1
(45) Date of Patent: Oct. 9, 2018

(54) HEAD-MOUNTED DISPLAY

(71) Applicant: Quanta Computer Inc., Taoyuan (TW)

(72) Inventors: Shu-Cheng Hsu, Taoyuan (TW); Ku-Wu Lai, Taoyuan (TW); Hsin-I Wu, Taoyuan (TW); Chien-Yu Shih, Taoyuan (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 0 days.

(21) Appl. No.: 15/724,356

(22) Filed: Oct. 4, 2017

(30) Foreign Application Priority Data

Jul. 18, 2017 (TW) .............................. 106123950 A

(51) Int. Cl.
*G06F 3/01* (2006.01)
*G02B 27/01* (2006.01)

(52) U.S. Cl.
CPC ..... *G02B 27/0176* (2013.01); *G02B 27/0172* (2013.01)

(58) Field of Classification Search
CPC ... G02B 27/017; G02B 27/0172; H04W 4/80; H01L 27/3276
See application file for complete search history.

(56) References Cited

U.S. PATENT DOCUMENTS

2009/0243967 A1* 10/2009 Kato .................... G02B 27/017
345/8

FOREIGN PATENT DOCUMENTS

TW    103399411 A    11/2013

OTHER PUBLICATIONS

Chinese language office action dated Oct. 31, 2017, issued in application No. TW 106123950.

* cited by examiner

*Primary Examiner* — Abbas Abdulselam
(74) *Attorney, Agent, or Firm* — McClure, Qualey & Rodack, LLP

(57) ABSTRACT

A head-mounted display includes a display device, a bonding structure connected to the display device, a driving element connected to the bonding structure, and a rotation button connected to the driving element. When the rotation button is rotated, the length of the bonding structure is changed by the driving element.

13 Claims, 13 Drawing Sheets

US 10,095,038 B1

HEAD-MOUNTED DISPLAY

CROSS-REFERENCE TO RELATED APPLICATIONS

This Application claims priority of Taiwan Patent Application No. 106123950 filed on Jul. 18, 2017, the entirety of which is incorporated by reference herein.

BACKGROUND OF THE INVENTION

Field of the Invention

The present disclosure relates to a display, and in particular to a head-mounted display.

Description of the Related Art

In order for the user to wear the virtual reality apparatus on his head, a headband connected to the display of the virtual reality apparatus is utilized. In general, a virtual reality apparatus worn on the user's head requires complex processes and adjustments.

Although conventional virtual reality apparatus have been generally adequate for their intended purposes, they have not been entirely satisfactory in all respects. Consequently, it is desirable to provide a solution for improving upon conventional virtual reality apparatus.

BRIEF SUMMARY OF THE INVENTION

The disclosure provides a head-mounted display, which can be easily donned and removed from the user's head.

The disclosure provides a head-mounted display including a display device, a bonding structure, and an adjusting device. The bonding structure is connected to the display device, and includes a first bonding band with a first end and a second bonding band with a second end. The adjusting device is connected to the bonding structure, and includes a housing, a driving element, a blocking structure, and a rotation button. The first bonding band and the second bonding band can be movably disposed in the housing.

The driving element is rotatably disposed in the housing, and connected to the first bonding band and the second bonding band. The blocking structure is affixed in the housing. The blocking structure allows the driving element to rotate in a first rotation direction, and is configured to selectively block the driving element from rotating in a second rotation direction that is the opposite of the first rotation direction. The rotation button is rotatably disposed in the housing, and connected to the driving element. When the rotation button is rotated, the rotation button drives the driving element to rotate relative to the blocking structure, and the distance between the first end and the second end can be adjusted by the driving element.

In conclusion, the user can rotate the rotation button with one hand to change the length or size of the bonding structure, and thus the head-mounted display can be easily donned and removed from the user's head.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
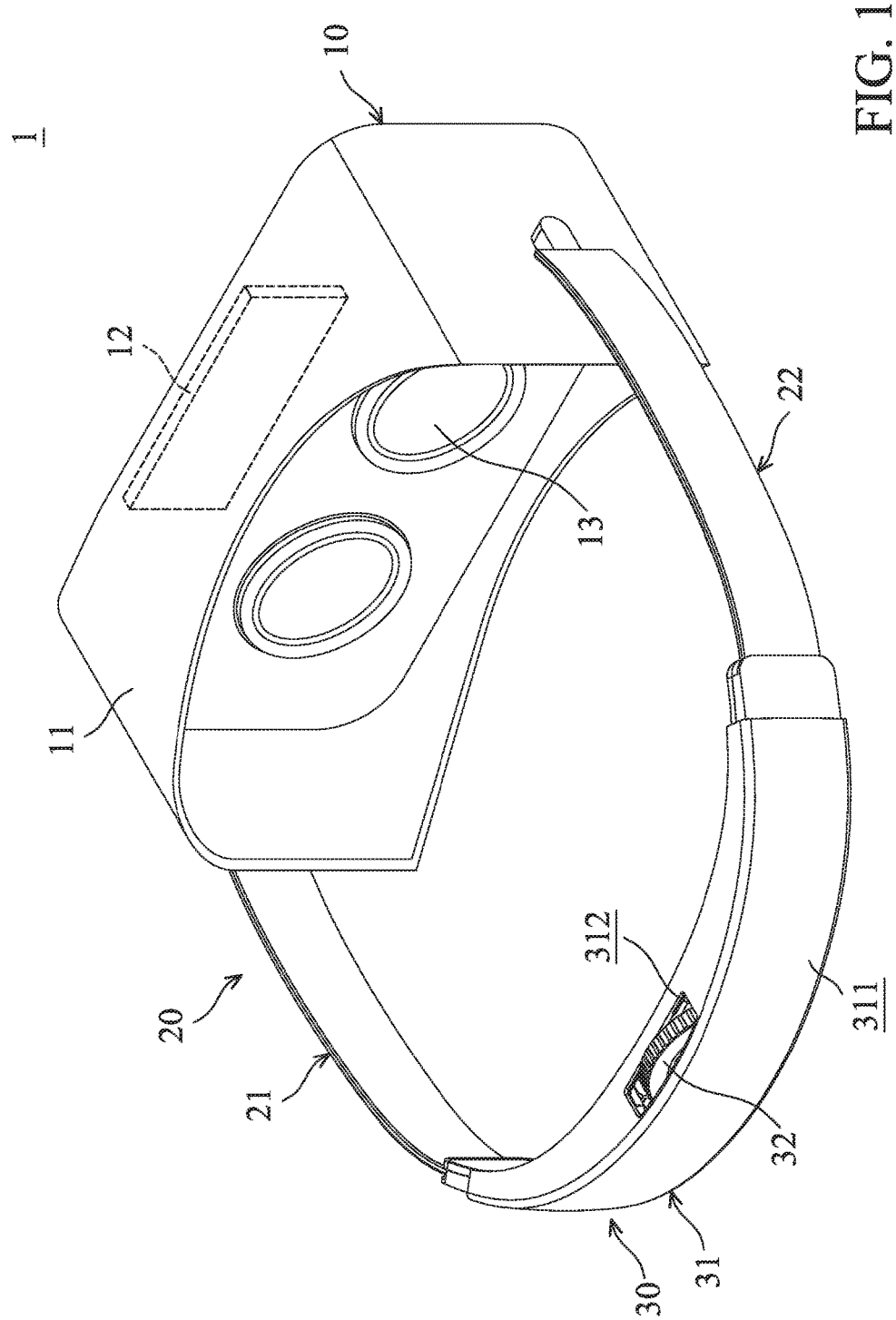
FIG. 1 is a perspective view of a head-mounted display in accordance with a first embodiment of the disclosure.

The following disclosure provides many different embodiments, or examples, for implementing different features of the present disclosure. Specific examples of components and arrangements are described below to simplify the present disclosure. For example, the formation of a first feature over or on a second feature in the description that follows may include embodiments in which the first and second features are formed in direct contact, and may also include embodiments in which additional features may be formed between the first and second features, such that the first and second features may not be in direct contact.

Spatially relative terms, such as upper and lower, may be used herein for ease of description to describe one element or feature's relationship to another element(s) or feature(s) as illustrated in the figures. The spatially relative terms are intended to encompass different orientations of the device in use or operation in addition to the orientation depicted in the figures. The shape, size, and thickness in the drawings may not be drawn to scale or simplified for clarity of discussion; rather, these drawings are merely intended for illustration.

Figure 2:
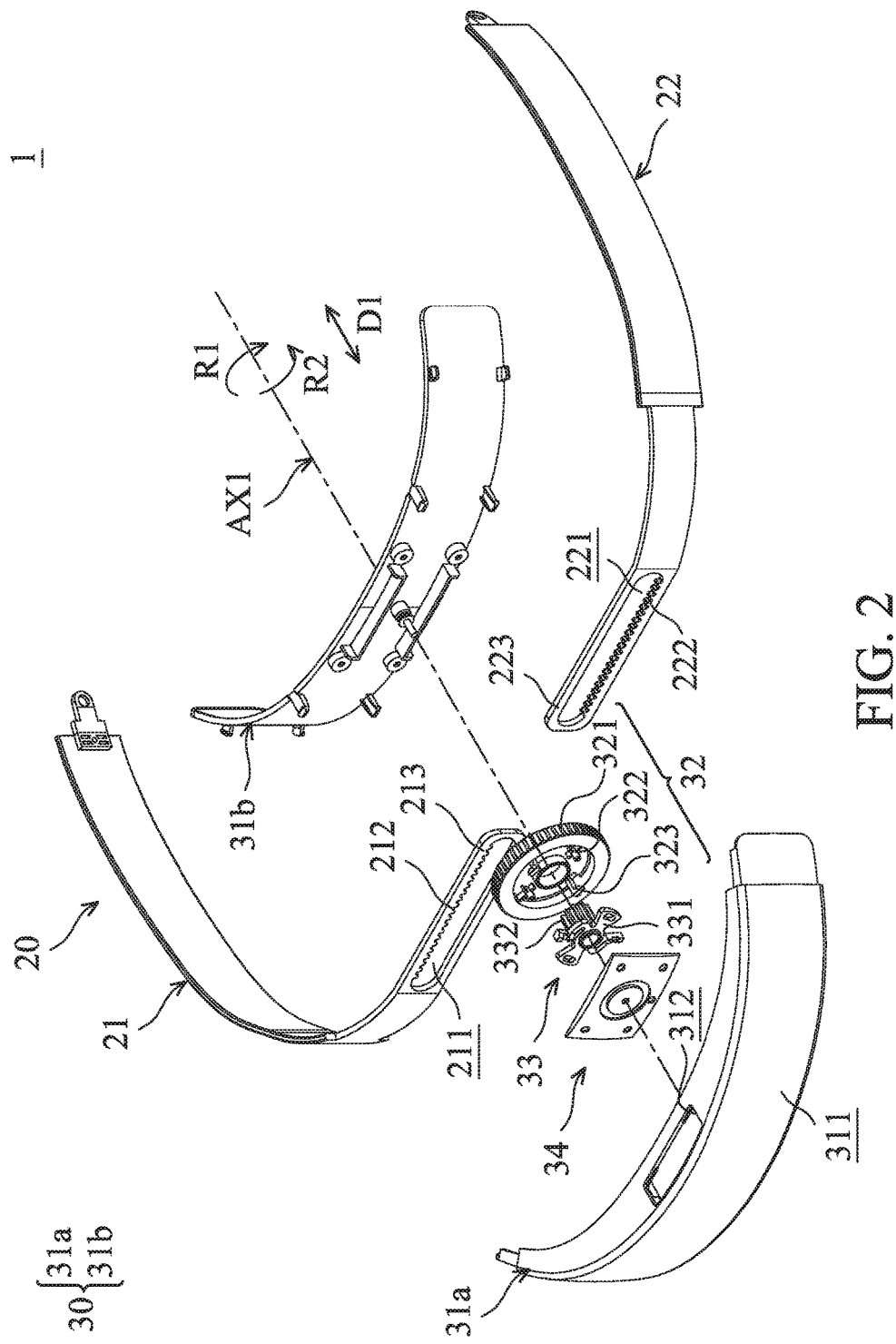
FIG. 2 is an exploded view the head-mounted display in accordance with the first embodiment of the disclosure.

FIG. 1 is a perspective view of a head-mounted display 1 in accordance with a first embodiment of the disclosure. FIG. 2 is an exploded view the head-mounted display 1 in accordance with the first embodiment of the disclosure. For clarity, the display device 10 is not illustrated in FIG. 2. The head-mounted display 1 is configured to be worn on the user's head, and provides 2D (two dimensional) images or 3D (three dimensional) images. In some embodiments, the head-mounted display 1 may be a head-mounted virtual reality apparatus.

The head-mounted display 1 includes a display device 10, a bonding structure 20, and an adjusting device 30. The bonding structure 20 is connected to two ends of the display device 10, and the adjusting device 30 is connected to the bonding structure 20. In this embodiment, the bonding structure 20 and the adjusting device 30 are formed as a U-shaped structure. In some embodiments, the bonding structure 20 and the adjusting device 30 are formed as a ring-like structure.

When the user wears the head-mounted display 1, the length or size of the bonding structure 20 can be firstly increased by adjusting the adjusting device 30, and thus the bonding structure 20 is disposed surrounding the head. Afterwards, the length or size of the bonding structure 20 can be decreased by adjusting the adjusting device 30, and thus the display device 10 can be stably disposed on the user's head.

The display device 10 includes a display housing 11 and a display panel 12. The display panel 12 is disposed in the display housing 11. The display panel 12 may be a liquid-crystal display panel (LCD panel) or an organic light-emitting diode panel (OLED panel), and is configured to display an image. In some embodiments, the image includes a left-eye image and a right-eye image different from the left-eye image. In some embodiments, there are two display panels 12, providing the same image, or respectively providing a left-eye image and a right-eye image. In a particular embodiment, the display panel 12 is a mobile phone or a display of a mobile device.

In the embodiment, the display device 10 further includes lenses 13. The lenses 13 are disposed on the display housing 11, and face the display panel 12. In this embodiment, there are at least two lenses 13, such as two or four. When the user wears the head-mounted display 1, the lenses 13 correspond to the left eye and the right eye. The images generated by the display panel 12 enter into the user's eyes via the lenses 13. When the head-mounted display 1 provides a 3D image, the head-mounted display 1 displays different images to the right eye and the left eye.

The bonding structure 20 includes a first bonding band 21 and a second bonding band 22. One end of the first bonding band 21 is connected to the housing 31 of the adjusting device 30. The first bonding band 21 has a first guiding groove 211 and a first gear rack 212. The first gear rack 212 and the first guiding groove 211 are elongated structures extending along the first bonding band 21. The first gear rack 212 is located in the first guiding groove 211, and the first gear rack 212 and the first guiding groove 211 are located at the first end 213 of the first bonding band 21.

One end of the second bonding band 22 is connected to the housing 31. In other words, two opposite sides of the housing 31 are connected to the first bonding band 21 and the second bonding band 22 respectively. The second bonding band 22 has a second guiding groove 221 and a second gear rack 222. The second gear rack 222 and the second guiding groove 221 are elongated structures extending along the second bonding band 22. The second gear rack 222 is located in the second guiding groove 221, and the second gear rack 222 and the second guiding groove 221 are located at the second end 223 of the second bonding band 22.

The adjusting device 30 is connected to the first bonding band 21 and the second bonding band 22. The first bonding band 21 and the second bonding band 22 are overlapped in the adjusting device 30. The adjusting device 30 is configured to adjust the overlapped portions of the first bonding band 21 and the second bonding band 22 so as to change the length or size of the bonding structure 20. By adjusting the length or size of the bonding structure 20, the display device 10 can be stably worn on the user's head, and the head-mounted display 1 can be easily removed from the user's head.

Figure 3:
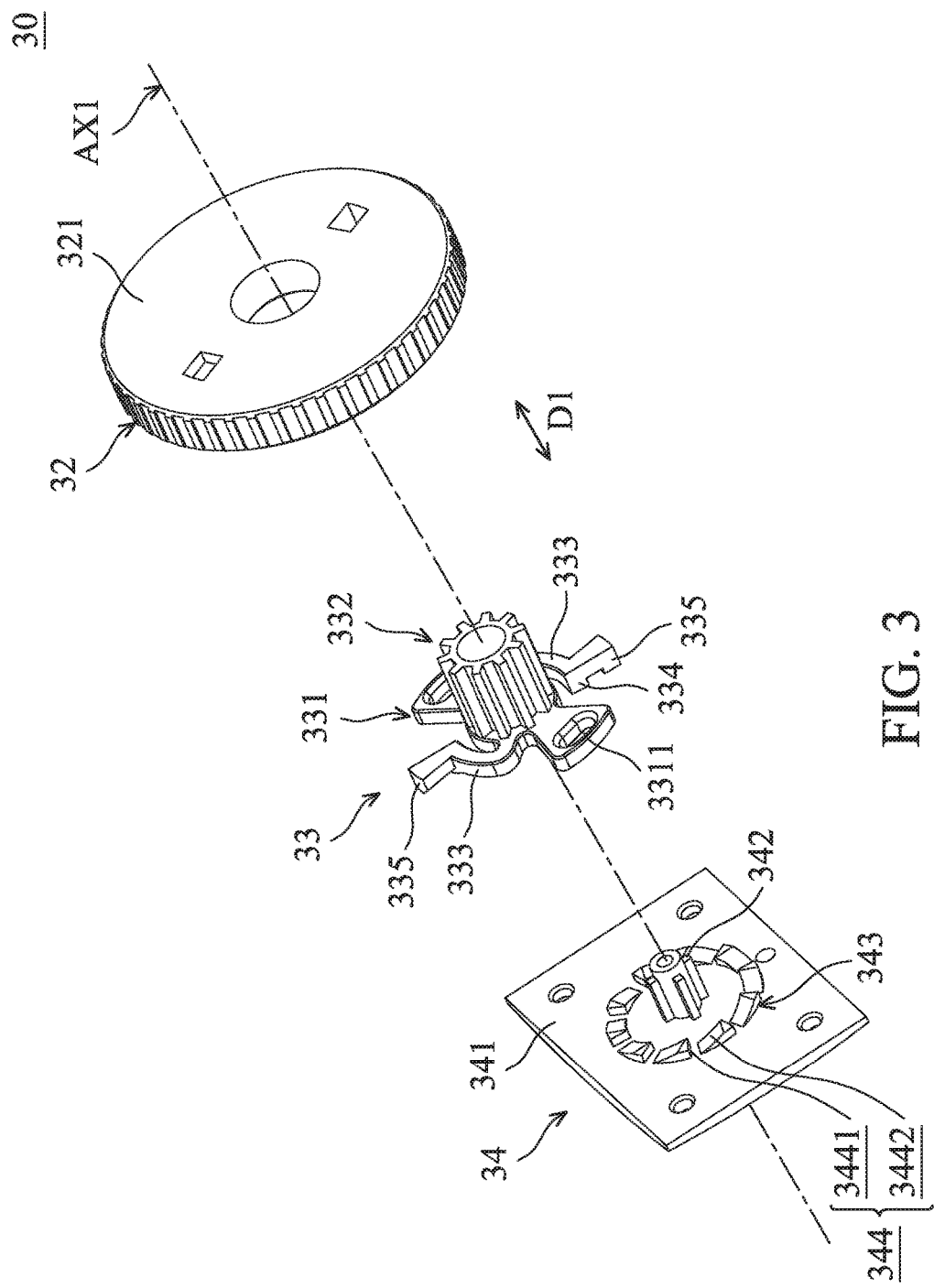
FIG. 3 is a perspective view of the adjusting device in accordance with the first embodiment of the disclosure.
Figure 4:
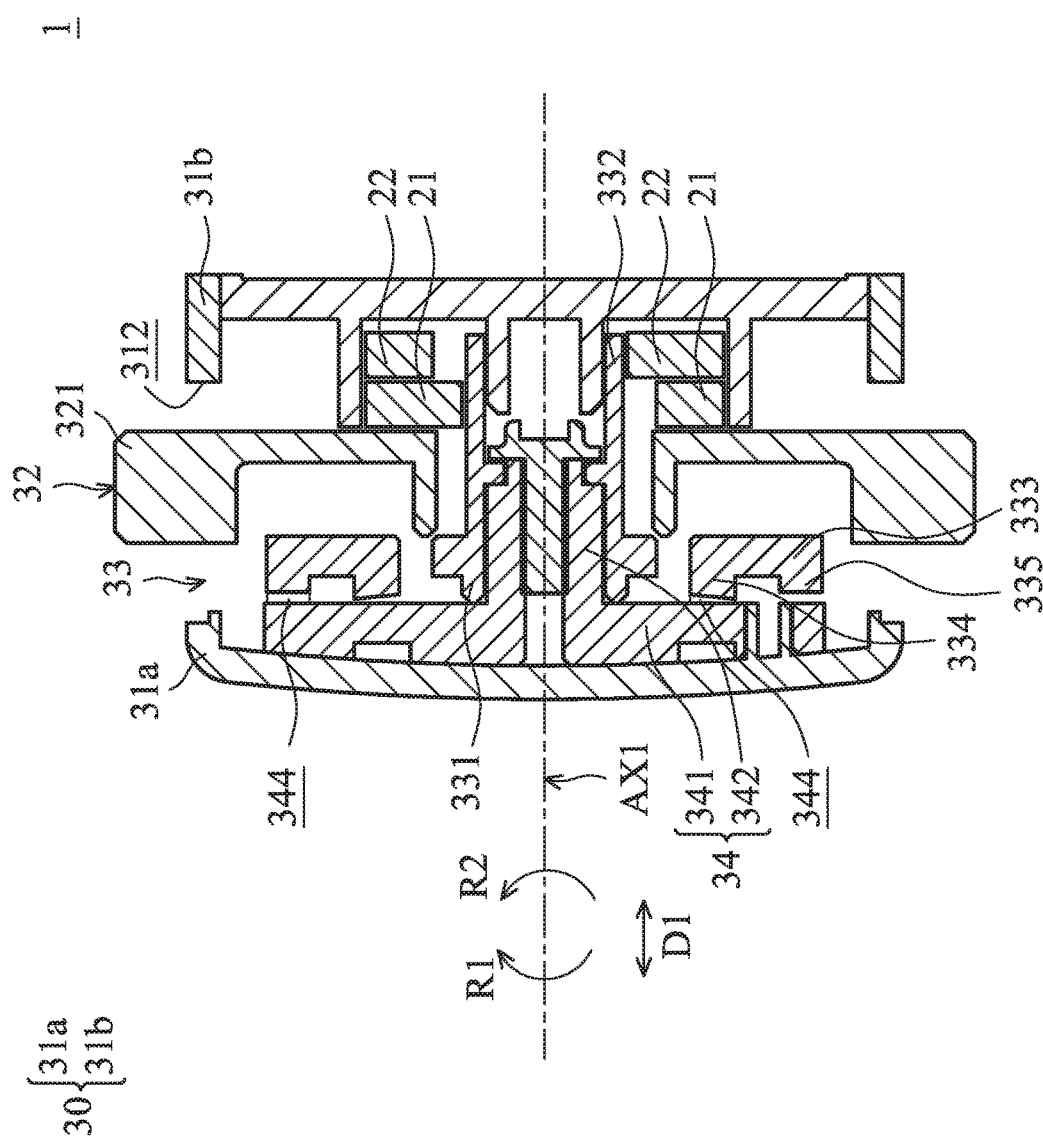
FIG. 4 is a cross-sectional view of the head-mounted display in accordance with the first embodiment of the disclosure.

FIG. 3 is a perspective view of the adjusting device 30 in accordance with the first embodiment of the disclosure. For clarity, the housing 31 is not illustrated in FIG. 3. FIG. 4 is a cross-sectional view of the head-mounted display 1 in accordance with the first embodiment of the disclosure. In FIG. 4, the cross section is parallel to or passes through a rotation axis AX1.

The adjusting device 30 includes a housing 31, a rotation button 32, a driving element 33, and a blocking structure 34. The housing 31 may be an elongated structure. Moreover, the housing 31 may be a curved structure corresponding to the user's head. The first bonding band 21 and the second bonding band 22 may be movably disposed in the housing 31.

In this embodiment, the housing 31 includes a first housing 31a and a second housing 31b. The first housing 31a is disposed on the second housing 31b. The first bonding band 21, the second bonding band 22, the rotation button 32, and the driving element 33 are located between the first housing 31a and the second housing 31b. The first housing 31a includes an outer surface 311 and an opening 312 formed on the outer surface 311.

The rotation button 32 may be rotatably disposed in the housing 31, and connected to the driving element 33. When the rotation button 32 is rotated, the rotation button 32 drives the driving element 33 rotating relative to the blocking structure 34 so as to change the length or size of the bonding structure 20.

As shown in FIGS. 2 and 3, the rotation button 32 includes a rotation body 321, guiding elements 322, and switching elements 323. The rotation body 321 may be rotatably disposed on the housing 31. The rotation body 321 can be rotated about a rotation axis AX1. In other words, the rotation axis AX1 passes through the center of the rotation body 321. In this embodiment, the rotation body 321 is a disk-like structure extending perpendicular to the rotation axis AX1. The edge of the rotation body 321 of the rotation button 32 is exposed from the opening 312.

The guiding element 322 is disposed on the rotation body 321, and extends along an extension direction D1. The extension direction D1 is parallel to the rotation axis AX1. The guiding element 322 is arranged surrounding the rotation axis AX1, and parallel to the rotation axis AX1. In this embodiment, there are two guiding elements 322, but it is not limited thereto. In some embodiments, there are one or at least three guiding elements 322.

The switching element 323 is disposed on the rotation body 321. In the embodiment, the switching element 323 is arranged surrounding the rotation axis AX1. In this embodiment, the switching element 323 may be an L-shaped structure. In this embodiment, there are two switching elements 323, but it is not limited thereto. In some embodiments, there are one or at least three switching elements 323.

The driving element 33 is rotatably disposed on the housing 31, and connected to the first bonding band 21, the second bonding band 22, and the rotation button 32. The driving element 33 can be rotated about the rotation axis AX1. The driving element 33 includes a driving body 331, a driving gear 332, elasticity arms 333, blocking protrusions 334, and switching protrusions 335.

The driving body 331 is rotatably disposed in the housing 31, and connected to the rotation button 32. The driving body 331 may be a plate structure extending perpendicular to the rotation axis AX1. The driving body 331 can be rotated about the rotation axis AX1. In other words, the rotation axis AX1 can pass through the center of the driving body 331.

As shown in FIGS. 2 and 3, the driving body 331 has guiding holes 3311. One end of the guiding element 322 extends into the guiding hole 3311. Therefore, when the rotation button 32 is rotated, the rotation button 32 drivers the driving element 33 rotating relative to the blocking structure 34. In this embodiment, there are two guiding holes 3311, but it is not limited thereto. In some embodiments, there are one or at least three guiding holes 3311.

The driving gear 332 is disposed on the driving body 331, and passes through the center of the rotation button 32. The driving gear 332 can be rotated about the rotation axis AX1. The driving gear 332 can pass through the center of the rotation body 321, the first guiding groove 211 of the first bonding band 21, and the second guiding groove 221 of the second bonding band 22. Moreover, the driving gear 332 gears with the first gear rack 212 and the second gear rack 222. Therefore, when the rotation button 32 is rotated, the rotation button 32 drivers the driving gear 332 rotating. Afterwards, the driving gear 332 pushes the first bonding band 21 and the second bonding band 22, and thus the distance between the first end 213 and the second end 223 changes.

In this embodiment, the driving gear 332 and the driving body 331 are formed as a single piece, and are made of the same material, such as plastic. In some embodiments, the driving gear 332 and the driving body 331 are individually elements. The driving gear 332 is assembled with or affixed to the driving body 331.

The elasticity arm 333 is connected to the driving body 331. The blocking protrusion 334 and the switching protrusion 335 are connected to one end of the elasticity arm 333. Therefore, when the rotation button 32 is rotated, the rotation button 32 drives the blocking protrusion 334 and the switching protrusion 335 rotating relative to the blocking structure 34. In this embodiment, the elasticity arm 333 and the driving body 331 are located at the same plane. The blocking protrusion 334 and the switching protrusion 335 are disposed on the same side of the elasticity arm 333 facing the blocking structure 34.

In this embodiment, the distance between the switching protrusion 335 and the rotation axis AX1 is greater than the distance between the blocking protrusion 334 and the rotation axis AX1. In this embodiment, there are two elasticity arms 333, two blocking protrusions 334 and two switching protrusions 335, but it is not limited thereto. In some embodiments, there are one elasticity arm 333, one blocking protrusion 334, and one switching protrusion 335. In some embodiments, there are at least three elasticity arms 333, three blocking protrusions 334 and three switching protrusions 335.

In this embodiment, the driving body 331, the driving gear 332, the blocking protrusion 334, and the switching protrusion 335 are formed as a single piece, and are made of the same material, such as plastic.

The blocking structure 34 is disposed in the housing 31. In this embodiment, the blocking structure 34 is connected to the inner side of the first housing 31a, and adjacent to the driving element 33. The blocking structure 34 allows the driving element 33 to rotate in a first rotation direction R1, and is configured to selectively block the driving element 33 from rotating in a second rotation direction R2 that is the opposite of the first rotation direction R1. In some embodiments, the blocking structure 34 is affixed to the inner side of the first housing 31a. The blocking structure 34 and the first housing 31a are formed as a single piece, and are made of the same materials, such as plastic.

As shown in FIGS. 2 and 3, the blocking structure 34 includes a blocking base 341, a central shaft 342, a ring-like protrusion 343 and blocking grooves 344. The blocking base 341 may be a plate structure affixed to the first housing 31a. The central shaft 342 is located in the housing 31. In this embodiment, the central shaft 342 is disposed on the blocking base 341 extending along the rotation axis AX1. The central shaft 342 passes through the centers of the driving element 33 and the rotation button 32. In other words, the rotation button 32 and the driving element 33 can be rotated about the central shaft 342.

In some embodiments, the central shaft 342 may include a portion affixed to the inner side of the first housing 31a. In some embodiments, the central shaft 342 may include a portion affixed to the inner side of the second housing 31b.

The ring-like protrusion 343 is disposed on the blocking base 341. The ring-like protrusion 343 is surrounding to the central shaft 342. The blocking grooves 344 are formed on the ring-like protrusion 343, and arranged annularly on the ring-like protrusion 343. When the blocking protrusion 334 is located in the blocking groove 344, the blocking structure 34 blocks the driving element 33 from rotating in the second rotation direction R2, and allows the driving element 33 to rotate in the first rotation direction R1.

Figure 5:
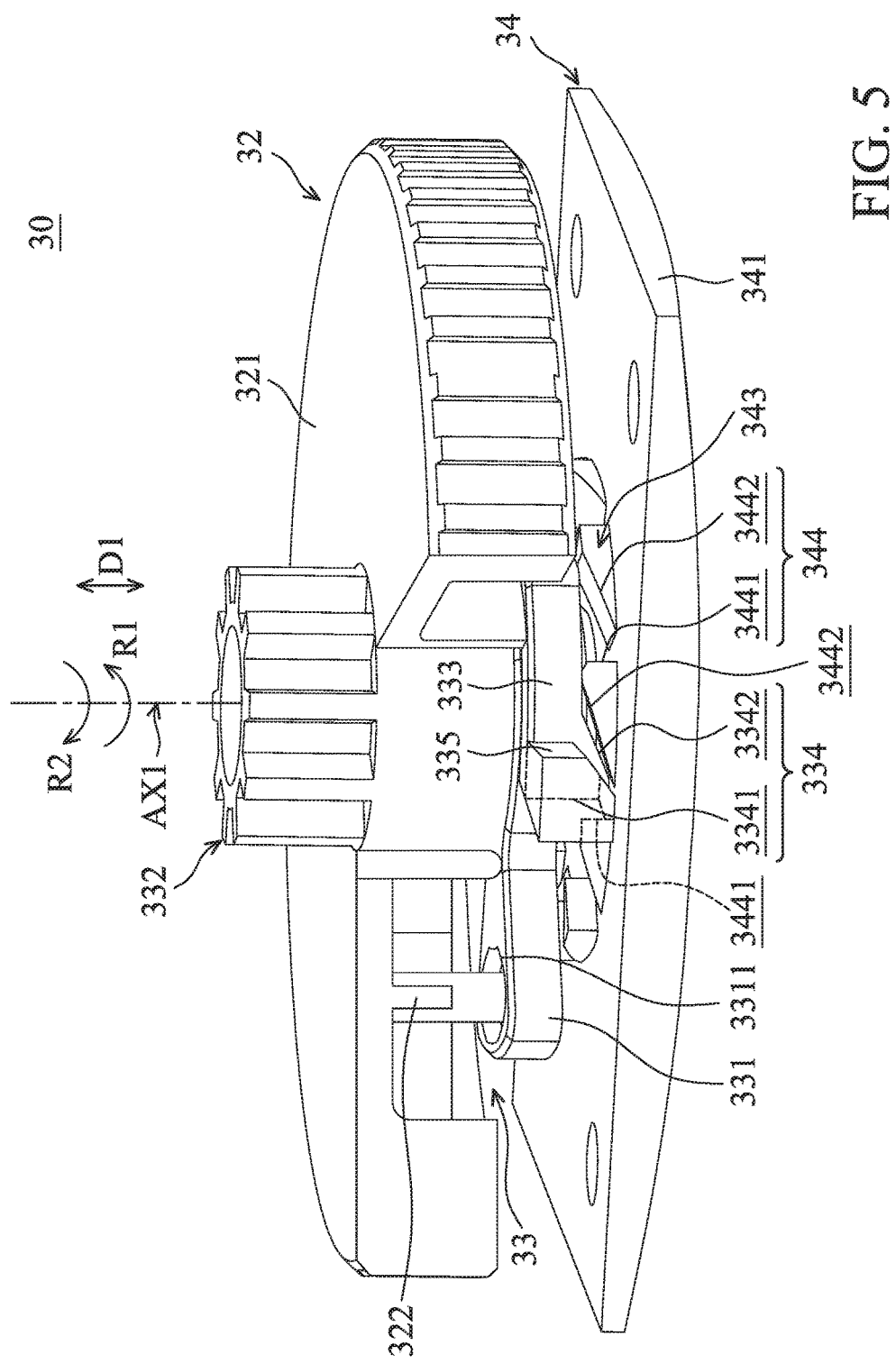
FIG. 5 is a perspective view of the adjusting device in accordance with the first embodiment of the disclosure.

FIG. 5 is a perspective view of the adjusting device 30 in accordance with the first embodiment of the disclosure. Each blocking protrusion 334 has a first blocking surface 3341 and a first inclined surface 3342. The first blocking surface 3341 extends along the extension direction D1. The first inclined surface 3342 is inclined relative to the first blocking surface 3341 or the extension direction D1.

Each blocking groove 344 has a second blocking surface 3441 and a second inclined surface 3442 connected to the second blocking surface 3441. The second blocking surface 3441 extends along the extension direction D1. The second inclined surface 3442 is inclined relative to the second blocking surface 3441. When the blocking protrusion 334 is located in the blocking groove 344, the first blocking surface 3341 corresponds to the second blocking surface 3441, and the first inclined surface 3342 corresponds to the second inclined surface 3442. As shown in FIG. 5, the first blocking surface 3341 faces the second blocking surface 3441, and the first inclined surface 3342 faces the second inclined surface 3442.

When the rotation button 32 is rotated in the first rotation direction R1, the guiding element 322 of the rotation button 32 pushes the driving element 33 rotating within the guiding hole 3311 so as to make the driving element 33 rotating in the first rotation direction R1 relative to the blocking structure 34. Moreover, Because of the elastic force of the elasticity arm 333, the first inclined surface 3342 slides along the second inclined surface 3442. Therefore, the driving element 33 can be rotated in the first rotation direction R1 relative to the blocking structure 34.

Figure 6:
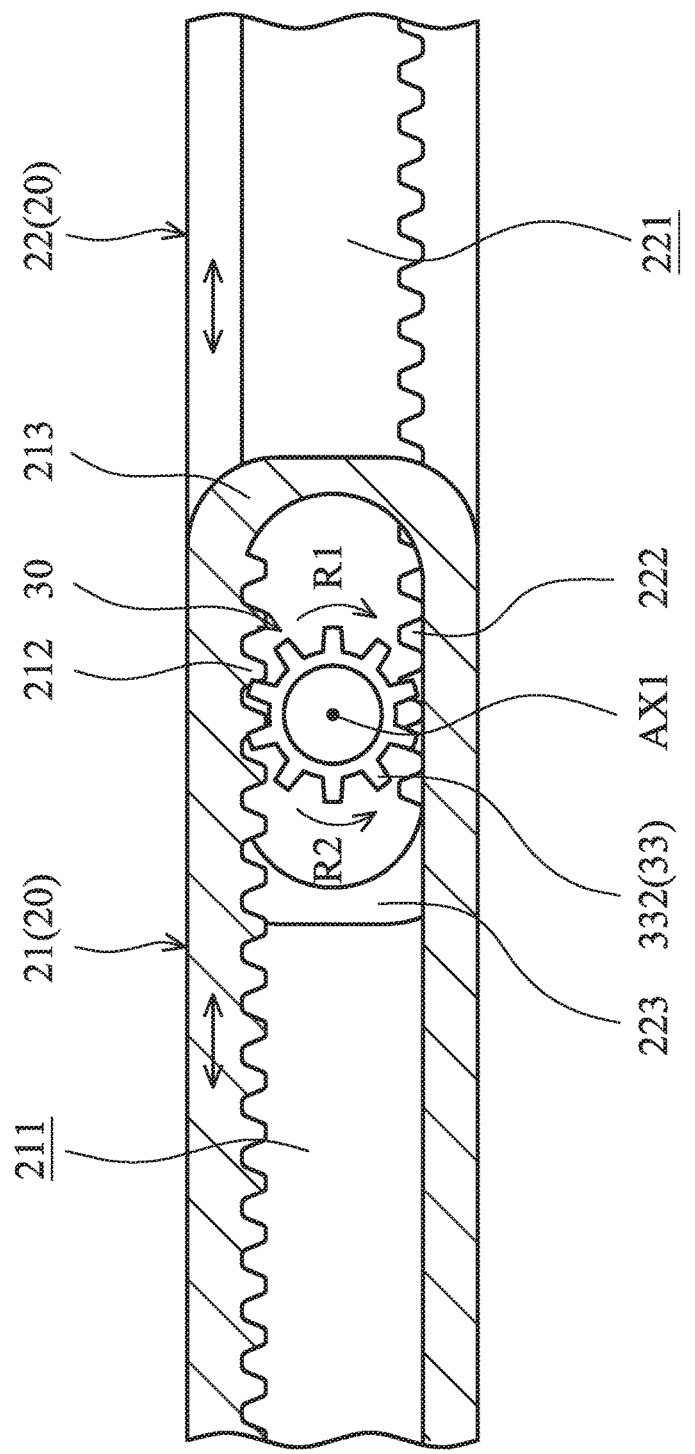
FIG. 6 is a cross-sectional view of the bonding structure and the driving element in accordance with the first embodiment of the disclosure.

FIG. 6 is a cross-sectional view of the bonding structure 20 and the driving element 33 in accordance with the first embodiment of the disclosure. The cross section in FIG. 6 is perpendicular to the rotation axis AX1. When the rotation button 32 is rotated in the first rotation direction R1, the driving gear 332 is also rotated in the first rotation direction R1 since the driving gear 332 is affixed to the driving element 33. Because the driving gear 332 is rotated in the first rotation direction R1, the first bonding band 21 is moved relative to the second bonding band 22, and the distance between the first end 213 and the second end 223 changes.

In the case, during the rotation button 32 rotating in the first rotation direction R1, the distance between the first end 213 and the second end 223 is gradually increased. In other words, the overlapped portions of the first bonding band 21 and the second bonding band 22 are increased. Thus, the length or sized of the bonding structure 20 is decreased, and the head-mounted display 1 can be stably worn on the user's head.

Moreover, as shown in FIGS. 5 and 6, when the rotation button 32 is not rotated and the first bonding band 21 and/or the second bonding band 22 are pulled, the driving element 33 is prevented from rotating in the second rotation direction R2 relative to the blocking structure 34 since the first blocking surface 3341 abuts the second blocking surface 3441. In other words, because of the blocking protrusion 334 of the driving element 33 and the blocking groove 344 of the blocking structure 34, the first end 213 is prevented from moving towards to the second end 223, and is allowed to be located far away from the second end 223 when the rotation button 32 is not being rotated. Therefore, when the rotation button 32 is not rotating, the length or size of the bonding structure 20 is prevented from increasing, and the head-mounted display 1 is prevented from falling off of the user's head.

Figure 7:
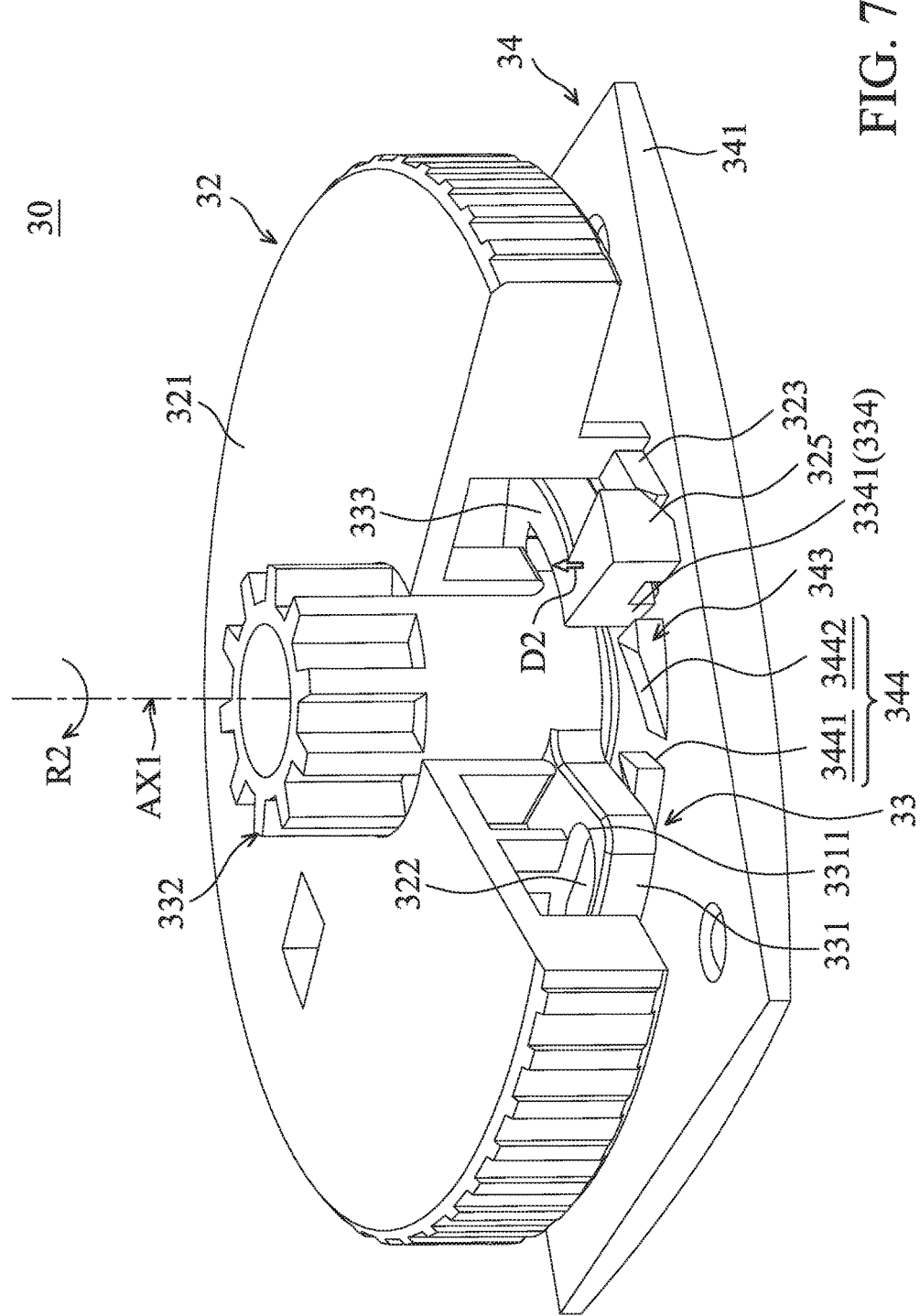
FIG. 7 is a perspective view of the adjusting device in accordance with the first embodiment of the disclosure.

FIG. 7 is a perspective view of the adjusting device 30 in accordance with the first embodiment of the disclosure. When the rotation button 32 is rotated in the second rotation direction R2, the guiding element 322 of the rotation button 32 pushes the driving element 33 to rotate in the guiding hole 3311, to make the driving element 33 rotate in the second rotation direction R2 relative to the blocking structure 34.

In this embodiment, when the rotation button 32 is rotated in the second rotation direction R2, the switching element 323 pushes the switching protrusion 335 to place the switching protrusion 335 (moving in the movement direction D2) far away from the blocking base 341. Since the switching protrusion 335 and the blocking protrusion 334 are located at the same elasticity arm 333, the elasticity arm 333 can pushes the blocking protrusion 334 and to make the blocking protrusion 334 out of the blocking groove 344. Therefore, the driving element 33 can be rotated in the second rotation direction R2 relative to the blocking structure 34.

In addition, as shown in FIG. 6, the driving gear 332 is also rotated in the second rotation direction R2 since the driving gear 332 is affixed to the driving element 33. Due to the driving gear 332 being rotated in the second rotation direction R2, the first bonding band 21 is moved relative to the second bonding band 22, and thus the distance between the first end 213 and the second end 223 changes.

In the case, during the rotation button 32 rotating in the second rotation direction R2, the distance between the first end 213 and the second end 223 is gradually decreased, and the first end 213 and the second end 223 are overlapped. In other words, the overlapped portions of the first bonding band 21 and the second bonding band 22 are decreased, and thus the length or size of the bonding structure 20 is increased, and the head-mounted display 1 can be easily removed from the user's head.

Accordingly, in this embodiment, the user can rotate the rotation button 32 with one hand to change the length or size of the bonding structure 20, and can easily wear the head-mounted display 1 on the head or removed the head-mounted display 1 from the head.

Figure 8:
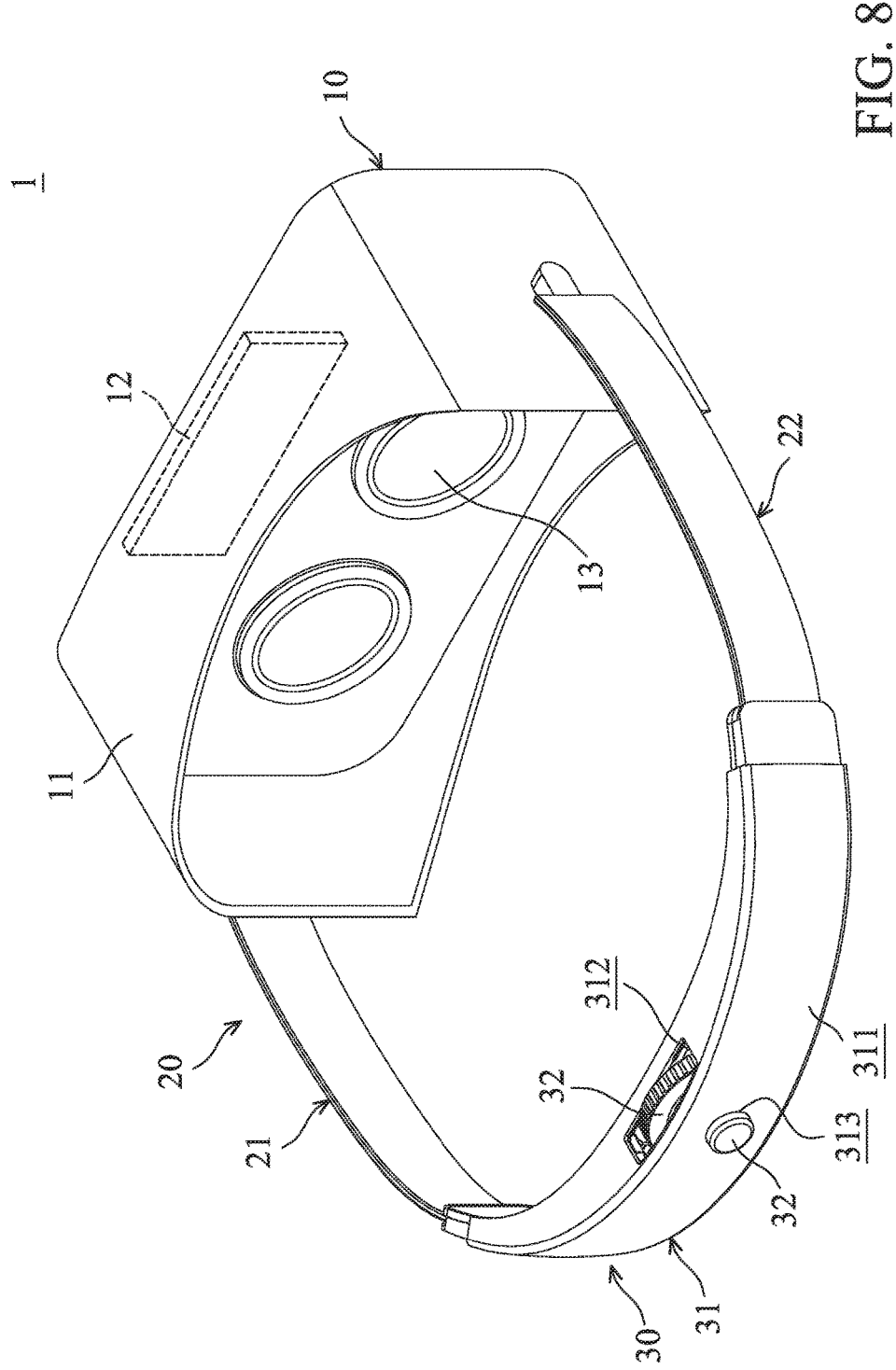
FIG. 8 is a perspective view of a head-mounted display in accordance with a second embodiment of the disclosure.
Figure 9:
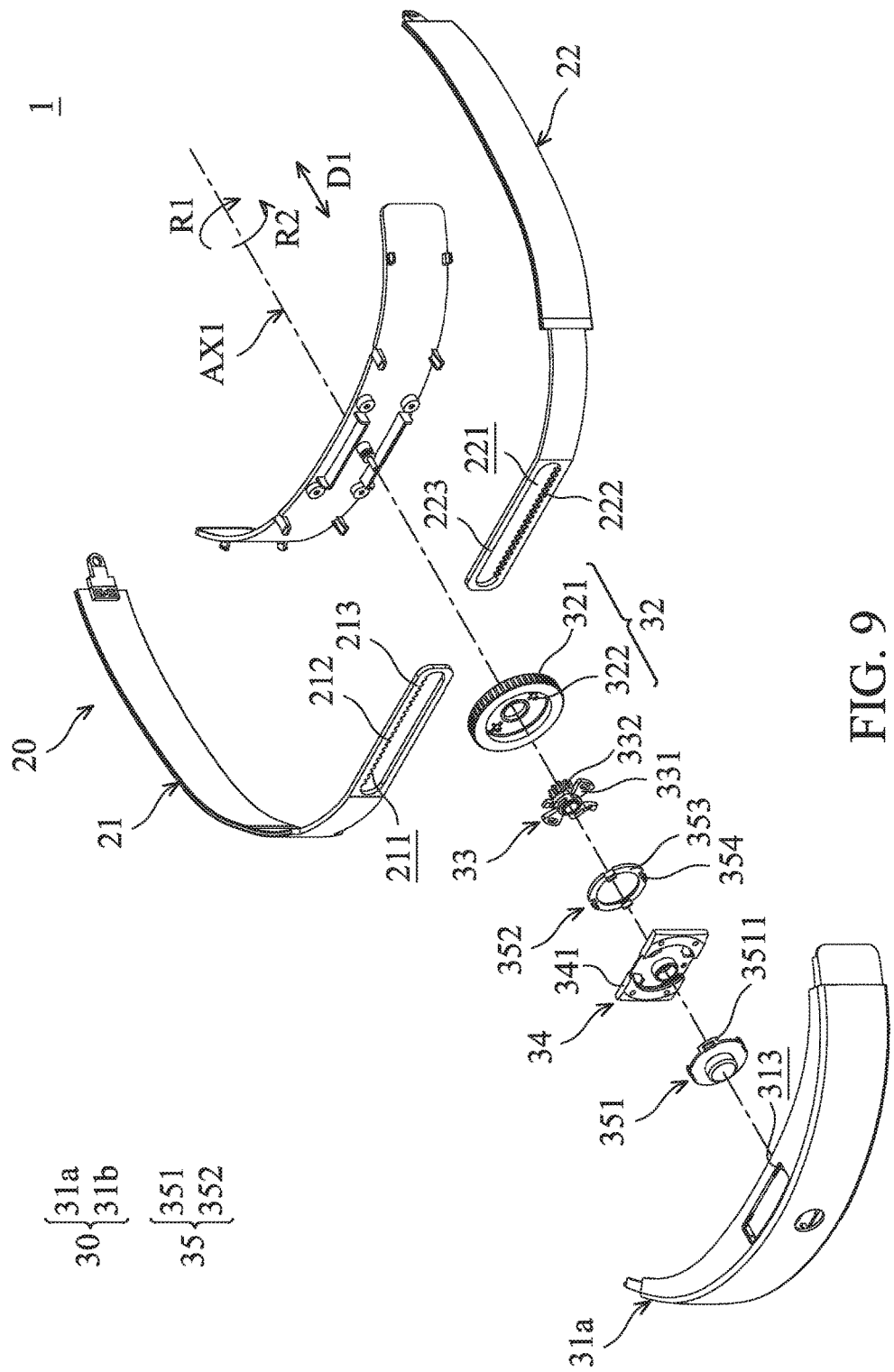
FIG. 9 is an exploded view the head-mounted display in accordance with the second embodiment of the disclosure.
Figure 10:
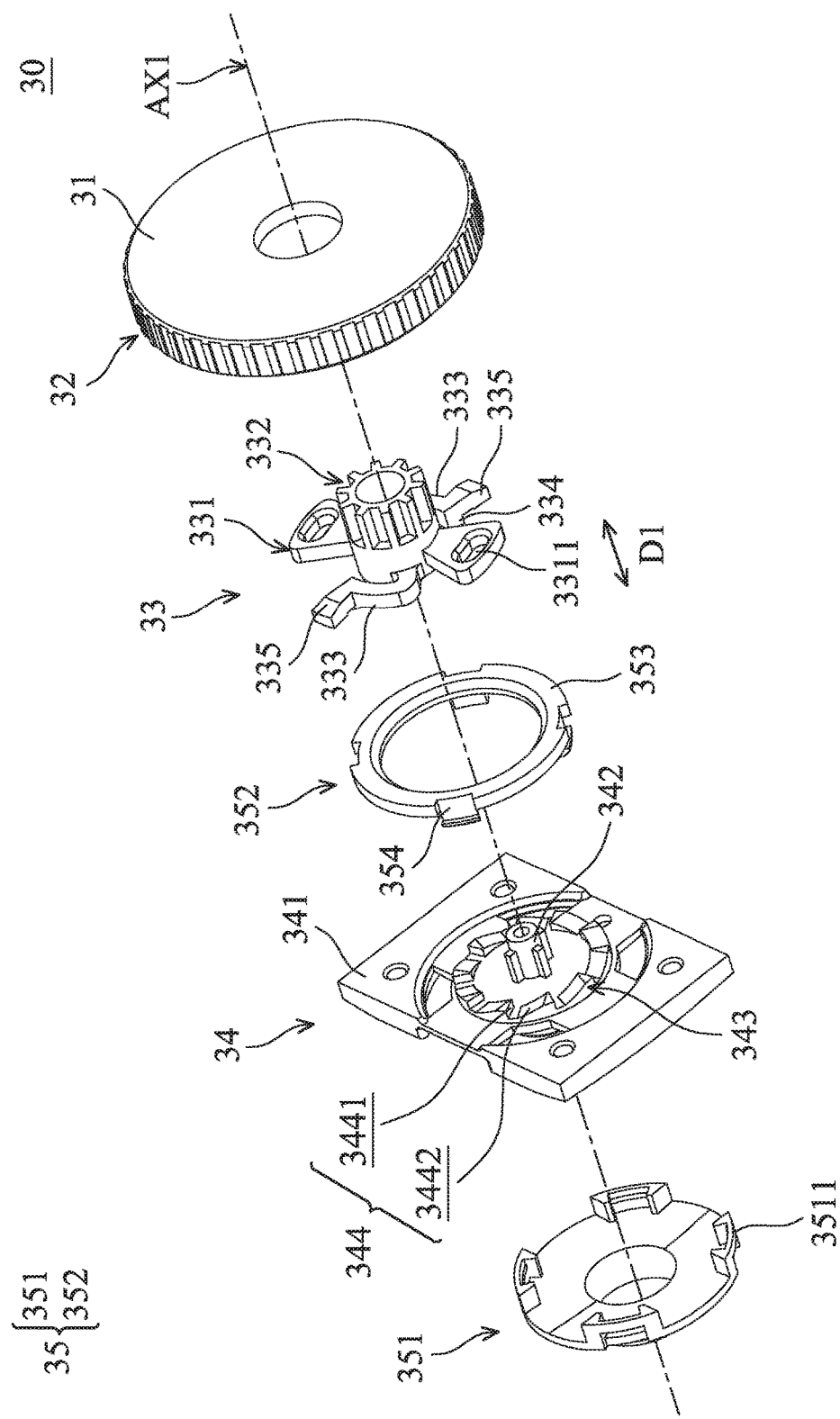
FIG. 10 is a perspective view of an adjusting device in accordance with the second embodiment of the disclosure.
Figure 11:
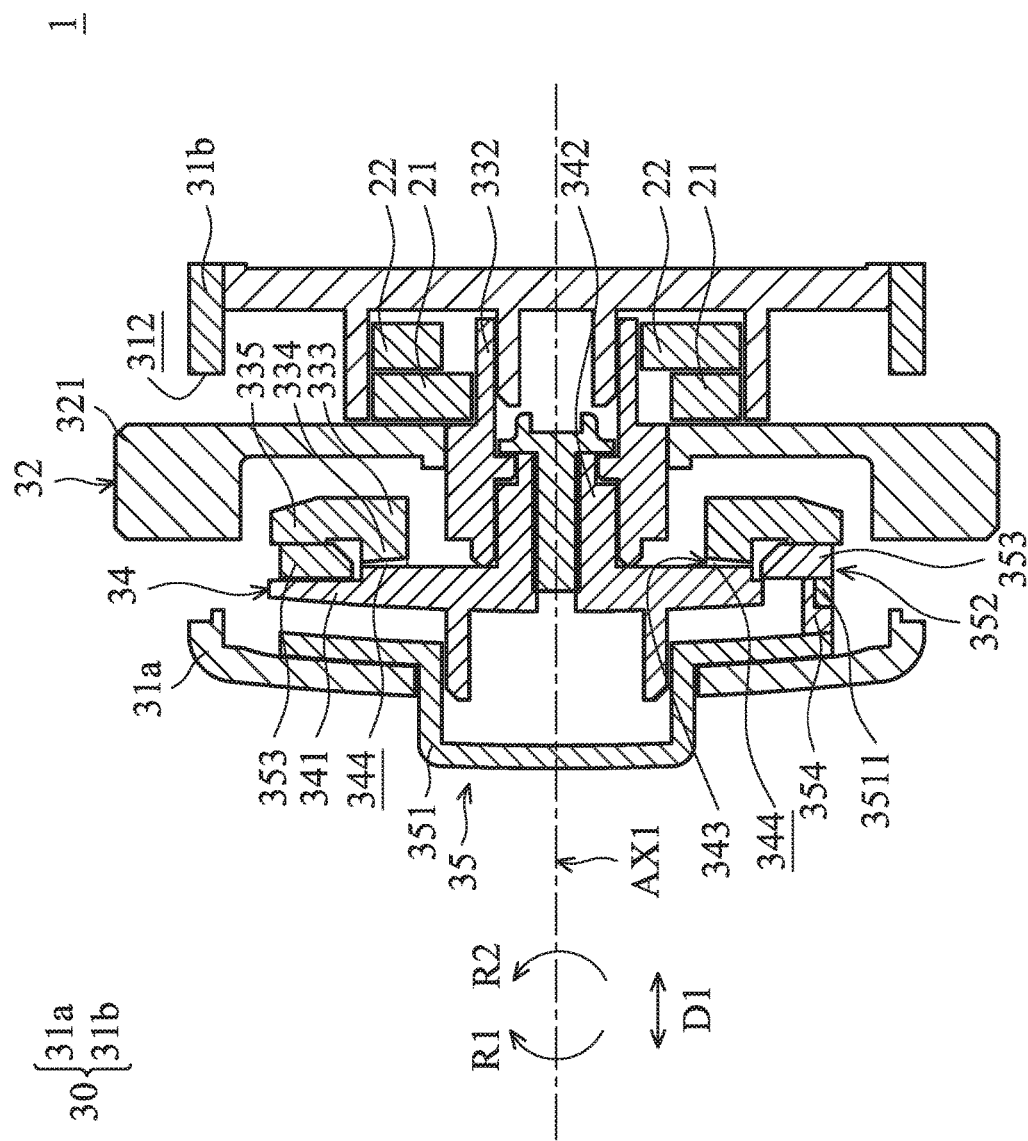
FIG. 11 is a cross-sectional view of the head-mounted display in accordance with the second embodiment of the disclosure.
Figure 12:
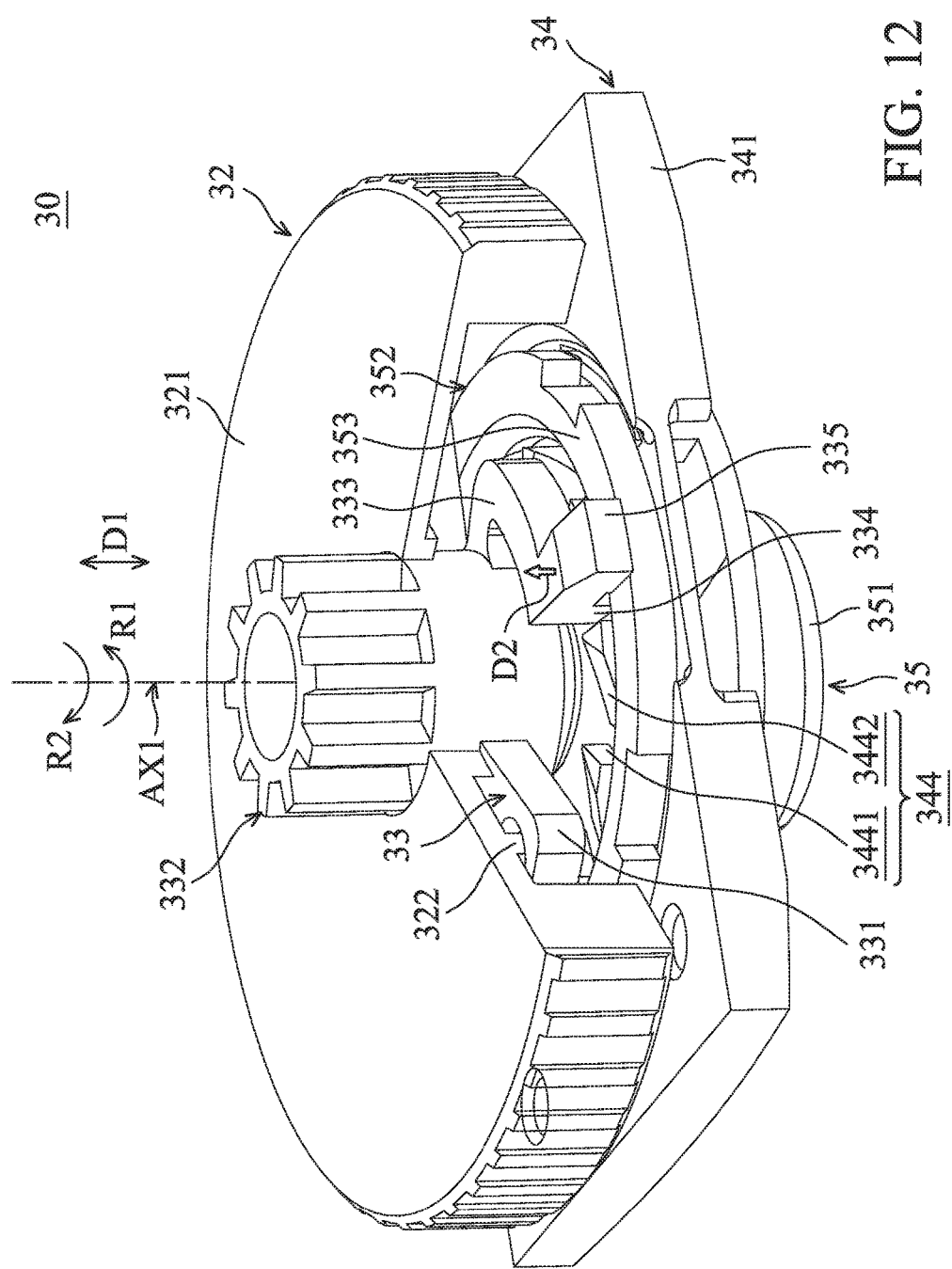
FIG. 12 is a perspective view of the adjusting device in accordance with the second embodiment of the disclosure.

FIG. 8 is a perspective view of a head-mounted display 1 in accordance with a second embodiment of the disclosure. FIG. 9 is an exploded view the head-mounted display 1 in accordance with the second embodiment of the disclosure. For clarity, the display device 10 is no illustrated in FIG. 9. FIG. 10 is a perspective view of an adjusting device 30 in accordance with the second embodiment of the disclosure. For clarity, the housing 31 is not illustrated in FIG. 10. FIG. 11 is a cross-sectional view of the head-mounted display 1 in accordance with the second embodiment of the disclosure. FIG. 12 is a perspective view of the adjusting device 30 in accordance with the second embodiment of the disclosure. In FIG. 11 and FIG. 12, the button 35 is located at an initial position.

In this embodiment, the rotation button 32 may not include the switching element 323 of the first embodiment. The switching protrusion 335 of the driving element 33 is located at a side wall of the elasticity arm 333 extending along a direction perpendicular to the rotation axis AX1.

The adjusting device 30 further includes a button 35. The button 35 is movably disposed on the housing 31. In this embodiment, the rotation axis AX1 passes through the center of the button 35, and the button 35 can be moved along the rotation axis AX1 or the extension direction D1. The button 35 includes a pressing element 351 and a switching element 352. The pressing element 351 is movably located in the button opening 313 of the first housing 31a. The button opening 313 is formed on the outer surface 311. In this embodiment, the opening 312 is located at the top of the first housing 31a, and the button opening 313 is located at the rear side of the first housing 31a. The pressing element 351 includes locking elements 3511.

The switching element 352 is connected to the pressing element 351, and may be a ring-like structure. The switching element 352 includes a switching body 353 and second locking elements 354. The switching body 353 may be a ring-like structure. The rotation axis AX1 passes through the center of the switching body 353. The second locking element 354 is disposed on the switching body 353, and locked to the locking element 3511.

In this embodiment, the locking element 3511 and/or the second locking element 354 passes through the blocking base 341 of the blocking structure 34. The blocking base 341 is located between the pressing element 351 and the switching body 353. Moreover, the locking element 3511 and the second locking element 354 extend along the extension direction D1, and thus the button 35 can be moved along the extension direction D1 or the rotation axis AX1s.

When the button 35 is located at an initial position, the ring-like protrusion 343 and the blocking groove 344 are located at the inner side of the switching body 353. Moreover, the switching body 353 is adjacent to the switching protrusion 335, and the switching protrusion 335 is not pushed by the switching body 353 in the extension direction D1. Therefore, the blocking protrusion 334 is located in the blocking groove 344. The blocking structure 34 can prevent the first end 213 of the first bonding band 21 from moving to the second end 223 of the second bonding band 22. The blocking structure 34 is configured to block the driving element 33 to rotate in the second rotation direction R2.

Figure 13:
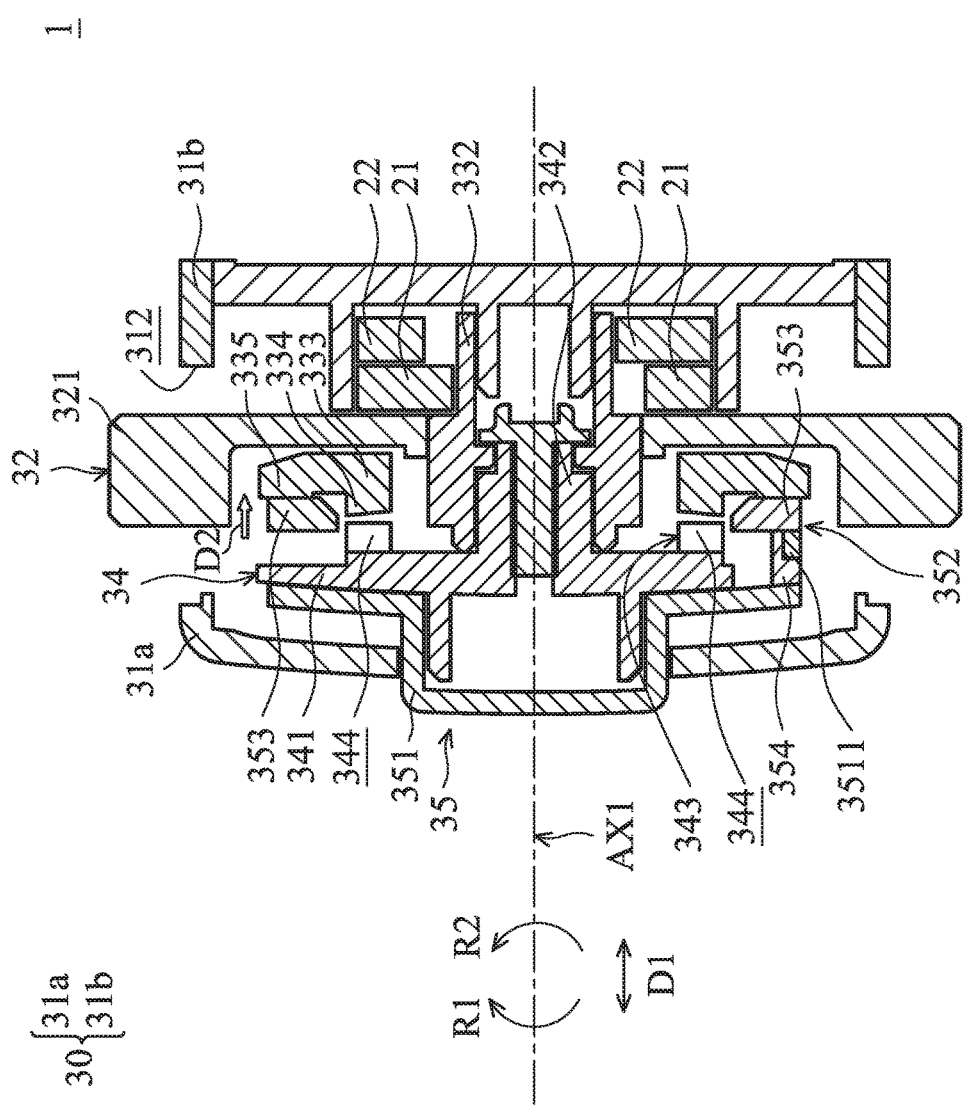
FIG. 13 is a cross-sectional view of the head-mounted display in accordance with the second embodiment of the disclosure.

FIG. 13 is a cross-sectional view of the head-mounted display 1 in accordance with the second embodiment of the disclosure. As shown in FIG. 13, the button 35 is located at a pressing location. When the button 35 is pressed to the pressing location, the switching body 353 of the switching element 352 pushes the switching protrusion 335 in the movement direction D2 so as to the blocking protrusion 334 is out of the blocking groove 344. The blocking structure 34 allows the driving element 33 to rotate in the first rotation direction R1 and the second rotation direction R2.

When the button 35 is pressed to the pressing location, the blocking structure 34 allows the first end 213 to move relative to the second end 223. Therefore, the user can hold the housing 31 of the adjusting device 30 in one hand, and can press the button 35. Afterwards, the length or size of the bonding structure 20 can be quickly adjusted by moving or pulling the housing 31 of the adjusting device 30.

In conclusion, the user can rotate the rotation button with one hand to change the length or size of the bonding structure, and thus the head-mounted display can be easily donned and removed from the user's head.

The disclosed features may be combined, modified, or replaced in any suitable manner in one or more disclosed embodiments, but are not limited to any particular embodiments.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A head-mounted display, comprising:
   a display device;
   a bonding structure connected to the display device, and comprising:
      a first bonding band having a first end; and
      a second bonding band having a second end;
   an adjusting device connected to the bonding structure, and comprising:
      a housing, wherein the first bonding band and the second bonding band are movably disposed in the housing; and
      a driving element rotatably disposed in the housing, and connected to the first bonding band and the second bonding band;
   a blocking structure affixed in the housing, wherein the blocking structure allows the driving element to rotate in a first rotation direction, and is configured to selectively block the driving element from rotating in a second rotation direction, which is opposite the first rotation direction; and
   a rotation button rotatably disposed in the housing, and connected to the driving element;
   wherein when the rotation button is rotated, the rotation button drives the driving element to rotate relative to the blocking structure so as to change a distance between the first end and the second end by the driving element.

2. The head-mounted display as claimed in claim 1, wherein the first bonding band comprises a first gear rack, the second bonding band comprises a second gear rack, and the driving element comprises a driving gear gearing with the first gear rack and the second gear rack, wherein when the rotation button is rotated, the rotation button drives the driving gear to rotate.

3. The head-mounted display as claimed in claim 1, wherein the driving element comprising:
   a driving body connected to the rotation button;
   an elasticity arm connected to the driving body; and
   a blocking protrusion connected to the elasticity arm,
   wherein the blocking structure further comprises a blocking groove, wherein when the blocking protrusion is located in the blocking groove, the blocking structure is configured to block the driving element from rotating in the second rotation direction.

4. The head-mounted display as claimed in claim 3, wherein the blocking protrusion comprises a first inclined surface and a first blocking surface, and the blocking groove comprises a second inclined surface corresponding to the first inclined surface and a second blocking surface corresponding to the first blocking surface,
   wherein when the rotation button is rotated in the first rotation direction, the driving element is rotated in the first rotation direction relative to the blocking structure, and the first inclined surface slides along the second inclined surface.

5. The head-mounted display as claimed in claim 3, wherein the rotation button comprises a switching element, and the driving element comprises a switching protrusion disposed on the elasticity arm, when the rotation button is rotated in the second rotation direction, the switching element pushes the switching protrusion to make the blocking protrusion out of the blocking groove, and the driving element is rotated in the second rotation direction relative to the blocking structure.

6. The head-mounted display as claimed in claim 3, wherein when the rotation button is not rotated and the first bonding band and/or the second bonding band is pulled, the blocking protrusion is located in the blocking groove, and the blocking structure prevents the first end from moving to the second end.

7. The head-mounted display as claimed in claim 1, wherein the blocking structure comprises a blocking base affixed to the housing and a ring-like protrusion disposed on the blocking base, and the blocking groove is formed on the ring-like protrusion.

8. The head-mounted display as claimed in claim 1, further comprising a button disposed on the housing, when the button is pressed to a pressing location, the blocking structure allows the first end to move relative to the second end, and when the button is located at an initial position, the blocking structure prevents the first end from moving relative to the second end.

9. The head-mounted display as claimed in claim 8, wherein the driving element comprises:
   a driving body connected to the rotation button;
   a elasticity arm connected to the driving body; and
   a blocking protrusion connected to the elasticity arm,
   wherein the blocking structure further comprises a blocking groove, when the button is located at the initial position, the blocking protrusion is located in the blocking groove, and the blocking structure is configured to block the driving element from rotating in the second rotation direction.

10. The head-mounted display as claimed in claim 9, wherein the button comprises a switching element, and the driving element comprises a switching protrusion disposed on the elasticity arm,
   wherein when the button is pressed to the pressing location, the switching element pushes the switching protrusion to make the blocking protrusion out of the blocking groove, and the blocking structure allows the driving element to rotate in the first rotation direction and the second rotation direction.

11. The head-mounted display as claimed in claim 10, wherein the button comprises a pressing element located at a button opening of the housing, and connected to the switching element, wherein the switching element of the button is a ring-like structure.

12. The head-mounted display as claimed in claim 1, wherein the housing has an opening, and an edge of the rotation button is exposed from the opening.

13. The head-mounted display as claimed in claim 1, further comprising a central shaft located in the housing and passing through the driving element and the rotation button, wherein the rotation button and the driving element is rotated about the central shaft.

\* \* \* \* \*